May 10, 1966  F. T. JASKOWIAK  3,250,565
FLEXIBLE UNIDIRECTIONAL BODY MOUNT
Filed April 20, 1964

INVENTOR.
FRANK T. JASKOWIAK
BY
HOWARD J. BARRNETT
Attorney

United States Patent Office 3,250,565
Patented May 10, 1966

3,250,565
FLEXIBLE UNIDIRECTIONAL BODY MOUNT
Frank T. Jaskowiak, Milwaukee, Wis., assignor to A. O. Smith Corporation, Milwaukee, Wis., a corporation of New York
Filed Apr. 20, 1964, Ser. No. 360,970
3 Claims. (Cl. 296—35)

This invention is directed to a flexible, unidirectional body mount, and more particularly, to a metallic keyhole-shaped tab which is lanced into a vehicle frame supporting surface. The keyhole-shaped tab provides a vertically flexible, horizontally stable platform on which a body-to-frame-attachement is mounted.

Prior unidirectional body mounts which utilize the bending characteristics of metal have comprised either separate metal elements incorporated into a body mount or have taken the form of flexible metal brackets welded to the vehicle frame. This invention contemplates lancing the frame itself to form an integral, flexible metal tab which become part of the attachment means between the vehicle frame and the body. The tab is of a keyhole configuration and effectively replaces the flexible metal bracket in function. Suitable relatively high rate elastic pads are disposed on the round portion of the tab, and the frame and body are secured together by means of a conventional body bolt assembly which extends through the pads.

The drawings illustrate the best mode presently contemplated for carrying out the invention.

Figure 1:
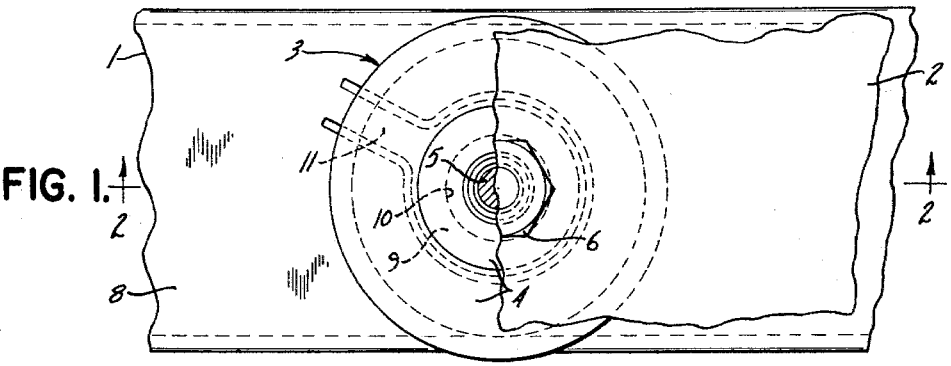
FIGURE 1 is a top plan view of the body mount of the invention with parts broken away.

As shown in the drawings, a frame member 1 is conventionally disposed below a vehicle body 2. A body mount assembly 3 is disposed therebetween to resiliently support the body on the frame.

The body mount assembly 3 comprises a plurality of annular elastic pads 4 through which extends a body attachment bolt 5, fitted with a nut 6 to secure the vehicle body 2 to the frame member 1.

The body mount assembly 3 is disposed on a key-shaped tab 7, which is lanced or otherwise provided in the top surface 8 of the frame member 1. The tab 7 has a round, annular head portion 9 with a bolt receiving opening 10 extending therethrough to receive the body attachment bolt 5. The tab 7 also includes a stem portion 11 which integrally connects the tab 7 to the frame member 1.

Figure 2:
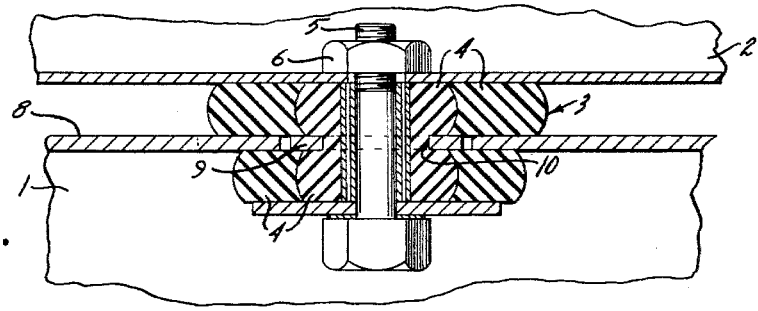
FIG. 2 is a vertical section through the body mount taken along line 2—2 of FIGURE 1.
Figure 3:
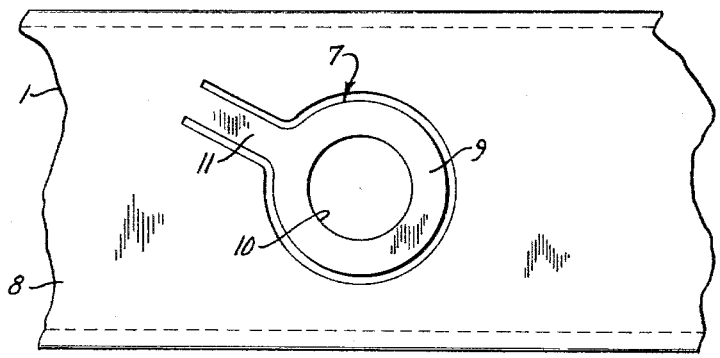
FIG. 3 is a top plan view showing only the frame and the tab lanced therein.

As can be seen in FIG. 2, the tab 7 is free to flex in a vertical direction. However, horizontal movement of the tab 7 is restrained by the stem portion 11 and the frame member 1.

The body mount of the invention provides a simple and relatively inexpensive means for obtaining undirectional vibration damping in a vehicle body-frame attachment system.

Various modes of carrying out the present invention are contemplated as being within the scope of the following claims particularly pointing out and distinctly claiming the subject matter which is regarded as the invention.

I claim:

1. A body mount for flexibly supporting a vehicle body on its frame comprising an integral metal leaf lanced into the load bearing surface of the frame, said metal leaf being co-planar with said load bearing surface a body attachment assembly connecting the vehicle body to said integral metal leaf, and means integral with said metal leaf for restraining lateral motion of said body mount while permitting maximum vertical flexibility above and below the load bearing surface of the frame.

2. The article of claim 1, in which the body attachment assembly includes a plurality of rubber pads in combination with said metal leaf thereby providing maximum damping of vertical vibrations.

3. A flexible metal tab lanced in the load bearing surface of a vehicle frame, for mounting a body attachment assembly thereon said tab having a generally keyhole-shaped profile including an enlarged, annular head portion for receiving a body attachment assembly and a narrow stem portion integral and co-planar with said frame and said annular head portion for flexibly connecting said frame to a vehicle body whereby lateral motion is restrained while maximum vertical flexibility of said body attachment assembly is permitted through and to both sides of said load bearing surface of the frame.

References Cited by the Examiner
UNITED STATES PATENTS

| 2,170,739 | 8/1939 | Tinnerman | 189—36 |
| 2,590,896 | 4/1952 | Seele | 189—36 |
| 3,013,643 | 12/1961 | Perry | 189—36 |
| 3,105,717 | 10/1963 | Schilberg | 296—35 |

FOREIGN PATENTS

| 508,815 | 1/1955 | Canada. |
| 897,972 | 6/1962 | Great Britain. |

BENJAMIN HERSH, *Primary Examiner.*
E. E. PORTER, *Assistant Examiner.*